(12) United States Patent  
Huang et al.

(10) Patent No.: US 12,054,039 B2  
(45) Date of Patent: Aug. 6, 2024

(54) BATTERY PACK AND VEHICLE

(71) Applicant: CONTEMPORARY AMPEREX TECHNOLOGY CO., LIMITED, Ningde (CN)

(72) Inventors: Haihua Huang, Ningde (CN); Tingting Zhu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 391 days.

(21) Appl. No.: 17/470,144

(22) Filed: Sep. 9, 2021

(65) Prior Publication Data

US 2021/0402863 A1    Dec. 30, 2021

Related U.S. Application Data

(63) Continuation of application No. PCT/CN2020/124548, filed on Oct. 28, 2020.

(30) Foreign Application Priority Data

Nov. 19, 2019 (CN) .......................... 201911133901.7

(51) Int. Cl.
| | | |
|---|---|---|
| *B60K 1/04* | (2019.01) | |
| *B60L 50/60* | (2019.01) | |
| *H01M 50/209* | (2021.01) | |

(52) U.S. Cl.
CPC ................ *B60K 1/04* (2013.01); *B60L 50/60* (2019.02); *H01M 50/209* (2021.01); *H01M 2220/20* (2013.01)

(58) Field of Classification Search
CPC .. B60K 1/04; H01M 50/209; H01M 2220/20; B60L 50/60

(Continued)

(56) References Cited

U.S. PATENT DOCUMENTS 8,608,230 B2 * 12/2013 Young .................. B62D 21/157  
    296/187.02  
9,056,631 B2 * 6/2015 Nakamori ........... H01M 50/227  
(Continued)

FOREIGN PATENT DOCUMENTS

CN      102714287 A    10/2012  
CN      205564850 U     9/2016  
(Continued)

OTHER PUBLICATIONS

International Search Report dated Jan. 28, 2021 issued in PCT/CN2020/124548.

(Continued)

*Primary Examiner* — Hau V Phan  
(74) *Attorney, Agent, or Firm* — Scully, Scott, Murphy & Presser, P.C.

(57) ABSTRACT

This application provides a battery pack and a vehicle. The battery pack includes: a battery accommodation box, including a box body and a cover body, where the box body fits with the cover body to form an accommodation space; a partition beam, disposed in the accommodation space to partition the accommodation space into a plurality of accommodation units, where the partition beam includes a hitch beam that extends in a first direction parallel to a bottom wall of the box body, a bottom of the hitch beam is fixed to the bottom wall of the box body, and a top of the hitch beam is connected to the cover body; and a plurality of battery modules, where the battery modules include a plurality of battery cells, and each battery module is disposed in a corresponding accommodation unit.

13 Claims, 6 Drawing Sheets

(58) Field of Classification Search
USPC .......................................................... 180/68.5
See application file for complete search history.

(56) References Cited

U.S. PATENT DOCUMENTS

| | | | | |
|---|---|---|---|---|
| 9,722,223 | B1* | 8/2017 | Maguire | B60L 50/64 |
| 9,884,544 | B2* | 2/2018 | Berger | B60K 1/04 |
| 10,207,573 | B2* | 2/2019 | Hara | H01M 50/264 |
| 10,259,506 | B2* | 4/2019 | Ayukawa | B62D 25/025 |
| 10,464,406 | B2* | 11/2019 | Kawabe | B60K 1/04 |
| 2018/0226702 | A1* | 8/2018 | Inoue | B60L 50/64 |
| 2018/0272853 | A1 | 9/2018 | Wang et al. | |
| 2019/0157642 | A1* | 5/2019 | Toyota | H01M 50/249 |

FOREIGN PATENT DOCUMENTS

| | | |
|---|---|---|
| CN | 106882029 A | 6/2017 |
| CN | 206564277 U | 10/2017 |
| CN | 206584986 U | 10/2017 |
| CN | 108063197 A | 5/2018 |
| CN | 108630843 A | 10/2018 |
| CN | 207993927 U | 10/2018 |
| CN | 208028111 U | 10/2018 |
| CN | 208093631 U | 11/2018 |
| CN | 109585705 A | 4/2019 |
| CN | 109742281 A | 5/2019 |
| CN | 209104229 U | 7/2019 |
| CN | 110190211 A | 8/2019 |
| CN | 209336853 U | 9/2019 |
| CN | 209472023 U | 10/2019 |
| EP | 3379598 A1 | 9/2018 |
| JP | H07112619 A | 5/1995 |
| JP | 2012128983 A | 7/2012 |
| JP | 2017027938 A | 2/2017 |
| JP | 2017193288 A | 10/2017 |
| WO | 2018033880 A2 | 2/2018 |
| WO | 2018186616 A1 | 10/2018 |

OTHER PUBLICATIONS

Notice of Reasons for Refusal dated Jul. 10, 2023 received in Japanese Patent Application No. JP 2022-527801.
Extended European Search Report dated May 10, 2022 received in European Patent Application No. EP 20889490.7.

* cited by examiner

BATTERY PACK AND VEHICLE

CROSS-REFERENCE TO RELATED APPLICATIONS

This application is a continuation of International Application No. PCT/CN2020/124548, filed on Oct. 28, 2020, which claims priority to Chinese Patent Application No. 201911133901.7, filed on Nov. 19, 2019, both of which are hereby incorporated by reference in their entireties.

TECHNICAL FIELD

This application relates to the field of power batteries and vehicles, and in particular, to a battery pack and a vehicle.

BACKGROUND

In a vehicle that contains a battery pack, such as an electric vehicle or a hybrid electric vehicle, the battery pack needs to be firmly connected to a vehicle body of the vehicle to meet strength requirements of the vehicle in use. To meet the strength requirements, frame design of the battery pack is crucial.

SUMMARY

This application provides a battery pack and a power battery to improve a mode shape and rigidity of the battery pack.

A first aspect of this application provides a battery pack, including:

a battery accommodation box, including a box body and a cover body, where the box body fits with the cover body to form an accommodation space;

a partition beam, disposed in the accommodation space to partition the accommodation space into a plurality of accommodation units, where the partition beam includes a hitch beam that extends in a first direction parallel to a bottom wall of the box body, a bottom of the hitch beam is fixed to the bottom wall of the box body in a third direction perpendicular to the bottom wall of the box body, and a top of the hitch beam is connected to the cover body; and a plurality of battery modules, where the battery modules include a plurality of battery cells, and each battery module is disposed in a corresponding accommodation unit.

In the third direction, the top of the hitch beam is higher than a top of the battery cells.

In some embodiments, a first hitch point configured to connect the battery pack to a vehicle body is disposed at the top of the hitch beam.

In some embodiments, the hitch beam includes:

a hitch beam top wall, connected to the cover body, where the first hitch point is disposed on the hitch beam top wall;

hitch beam side walls, located on two sides of the hitch beam top wall in a second direction and connected to the hitch beam top wall, where the second direction is perpendicular to the first direction and parallel to the bottom wall of the box body, and the hitch beam side walls extend from the hitch beam top wall toward the bottom wall of the box body; and a hitch beam mounting edge, connected to a bottom of one of the hitch beam side walls, where the hitch beam mounting edge extends from the one of the hitch beam side walls toward a side away from the one of the hitch beam side walls, and the hitch beam is connected to the bottom wall of the box body through the hitch beam mounting edge.

In some embodiments, the partition beam further includes a reinforcing beam extending in the second direction. The reinforcing beam is connected to the hitch beam. The second direction is perpendicular to the first direction and parallel to the bottom wall of the box body.

In some embodiments, a bottom of the reinforcing beam is fixed to the bottom wall of the box body. A top of the reinforcing beam is spaced apart from the cover body.

In some embodiments, the reinforcing beam includes:

a reinforcing beam top wall, spaced apart from the cover body;

reinforcing beam side walls, located on two sides of the reinforcing beam top wall in the first direction and connected to the reinforcing beam top wall, where the reinforcing beam side walls extend from the reinforcing beam top wall toward the bottom wall of the box body; and a reinforcing beam mounting edge, connected to a bottom of one of the reinforcing beam side walls, where the reinforcing beam mounting edge extends from the one of the reinforcing beam side walls toward a side away from the one of the reinforcing beam side walls, and the reinforcing beam is connected to the bottom wall of the box body through the reinforcing beam mounting edge.

In some embodiments, the hitch beam is integrally disposed in the first direction, and the reinforcing beam includes a plurality of reinforcing beam sections that are partitioned by the hitch beam and disposed sequentially in the second direction;

or, the reinforcing beam is integrally disposed in the second direction, and the hitch beam includes a plurality of hitch beam sections that are partitioned by the reinforcing beam and disposed sequentially in the first direction.

In some embodiments, in the third direction, the top of the hitch beam is higher than the top of the reinforcing beam.

In some embodiments, the battery pack further includes a connecting member electrically connected to output ends of different battery modules and a signal collecting member electrically connected to the battery cells. The connecting member and the signal collecting member are disposed at the top of the reinforcing beam.

In some embodiments, an avoidance notch configured to avoid the connecting member and the signal collecting member is disposed at a position of joint between the hitch beam and the reinforcing beam.

In some embodiments, the cover body includes a via hole corresponding to the first hitch point.

In some embodiments, the first hitch point includes a connecting hole disposed at the top of the hitch beam.

In some embodiments, the battery accommodation box further includes a cantilever beam. The cantilever beam is fixedly connected to an outer side of a bottom of the box body. Bulges protruding outward from side walls of the box body are disposed at two ends of the cantilever beam. Second hitch points configured to connect the battery pack to the vehicle body are disposed on the bulges.

In some embodiments, the cantilever beam extends in the first direction and is arranged alternately with the hitch beam in the second direction. The second direction is perpendicular to the first direction and parallel to the bottom wall of the box body.

A second aspect of this application provides a vehicle, including a vehicle body, a battery pack, and a first hitch component. The battery pack is the battery pack according to the first aspect of this application. A first hitch point is disposed at a top of the hitch beam. The first hitch component connects the battery pack to the vehicle body through the first hitch point.

Based on the battery pack provided in this application, the top of the hitch beam is higher than the top of the battery cells, so that the battery cells as a whole can be accommodated in a space partitioned off by the hitch beam. When the battery pack or a vehicle containing the battery pack is impacted by an external force, the hitch beam can sufficiently surround and protect the battery cells, prevent all or part of the battery cells from being directly impacted by the external force, and improve safety performance of the battery pack.

The vehicle provided in this application includes the battery pack, and therefore, possesses the same advantages as the battery pack according to this application.

Exemplary embodiments of this application are described below in detail with reference to drawings to make other features and advantages of this application clearer.

BRIEF DESCRIPTION OF DRAWINGS

To describe the technical solutions in the embodiments of this application more clearly, the following outlines the drawings used in the embodiments of this application. Apparently, the drawings outlined below are merely a part of embodiments of this application. A person of ordinary skill in the art may derive other drawings from the outlined drawings without making any creative efforts.

DETAILED DESCRIPTION OF EMBODIMENTS

Figure 1:
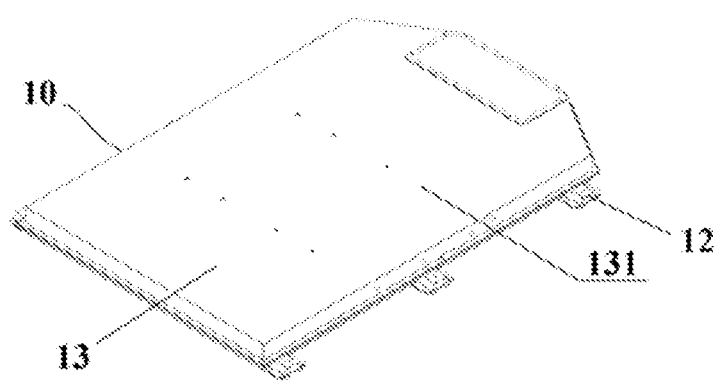
FIG. 1 is an overall schematic structural diagram of an assembled battery pack according to an embodiment of this application.

In the related art, the battery pack of the vehicle is generally located at a bottom of a passenger compartment, and a cantilever beam is disposed outside the bottom of the battery pack to connect to the vehicle body. The cantilever beam may be a longitudinal beam extending in a travel direction of the vehicle or a cross beam perpendicular to the travel direction of the vehicle. For vehicles of class A0 or above, the battery pack is relatively large in size. The cantilever beam disposed at the bottom of the battery pack alone can hardly meet the strength requirements of the battery pack under working conditions such as vibration and impact.

An accommodation space inside the battery pack can accommodate a plurality of battery modules. The battery modules may be in the form of a battery module group. The battery module group contains end plates and side plates. The end plates or side plates are mounted on a mounting beam inside the battery pack. The mounting beam is usually short in height, and generally shorter than 30 mm. The mounting beam contributes little to overall rigidity of the battery pack.

When no module group is designed for the battery modules of the battery pack, a battery cell of the battery module is fixed onto a box body by being glued to the bottom. When the battery pack is large in size, the rigidity of the battery pack hardly meets the strength requirements.

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

Figure 2:
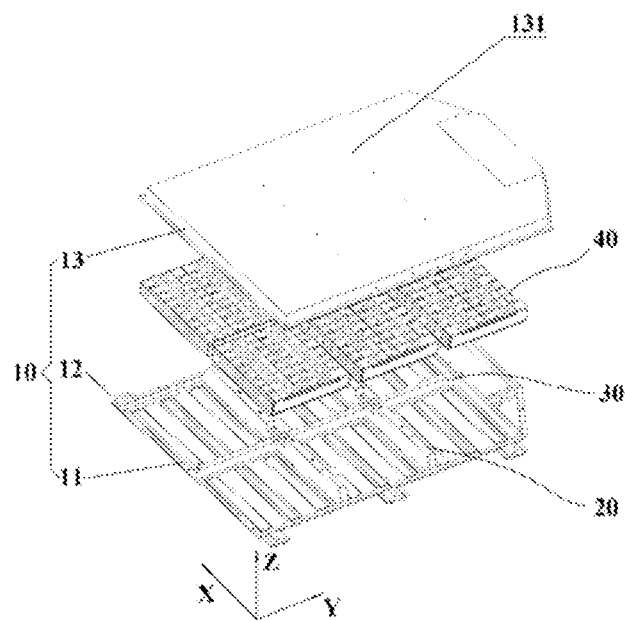
FIG. 2 is a schematic exploded view of a non-assembled battery pack according to an embodiment of this application.
Figure 3:
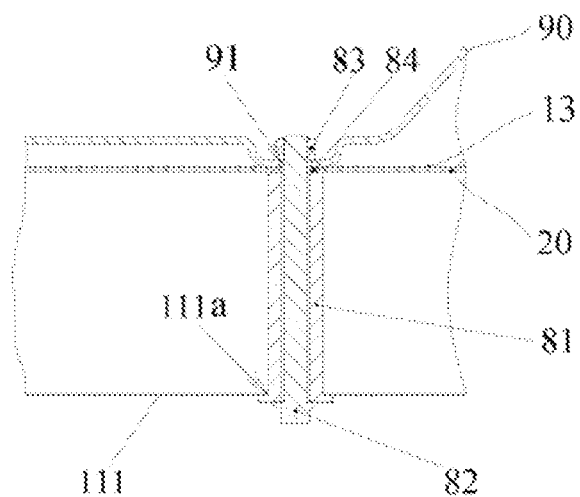
FIG. 3 is a local cross-sectional schematic structural diagram of connection of a battery pack and an underbody according to an embodiment of this application.

As shown in FIG. 1 to FIG. 3, an embodiment of this application provides a vehicle. The vehicle includes a vehicle body, a battery pack, and a first hitch component. The vehicle body includes an underbody 90. The battery pack and the vehicle body are connected onto the underbody 90 through the first hitch component.

As shown in FIG. 1 to FIG. 11, the battery pack of the vehicle according to this embodiment includes a battery accommodation box 10, a partition beam, and a plurality of battery modules.

The battery accommodation box 10 includes a box body 11 and a cover body 13. The box body 11 fits with the cover body 13 to form an accommodation space. The partition beam is disposed in the accommodation space to partition the accommodation space into a plurality of accommodation units V. The partition beam includes a hitch beam 20 that extends in a first direction X parallel to a bottom wall 111 of the box body 11. A bottom of the hitch beam 20 is fixed to the bottom wall 111 of the box body 11 in a third direction Z perpendicular to the bottom wall 111 of the box body 11. A top of the hitch beam 20 is connected to the cover body 13. In the third direction Z, the top of the hitch beam 20 is higher than a top of the battery cells 40.

Figure 4:
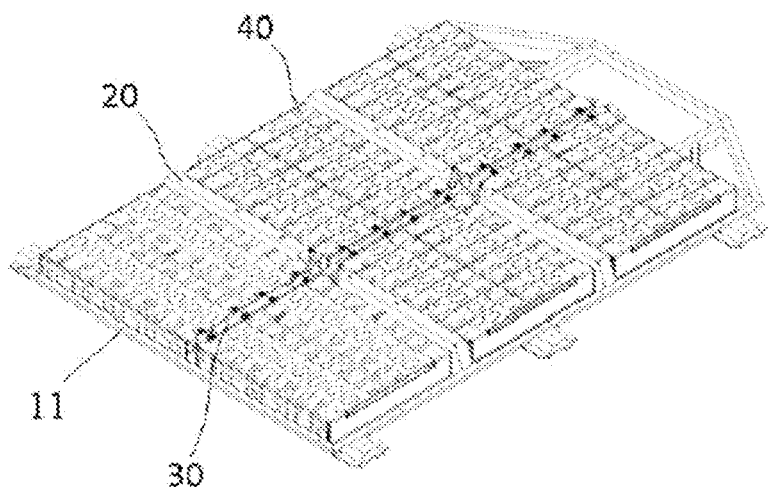
FIG. 4 is a schematic structural diagram of a battery pack free of a cover body according to an embodiment of this application.
Figure 5:
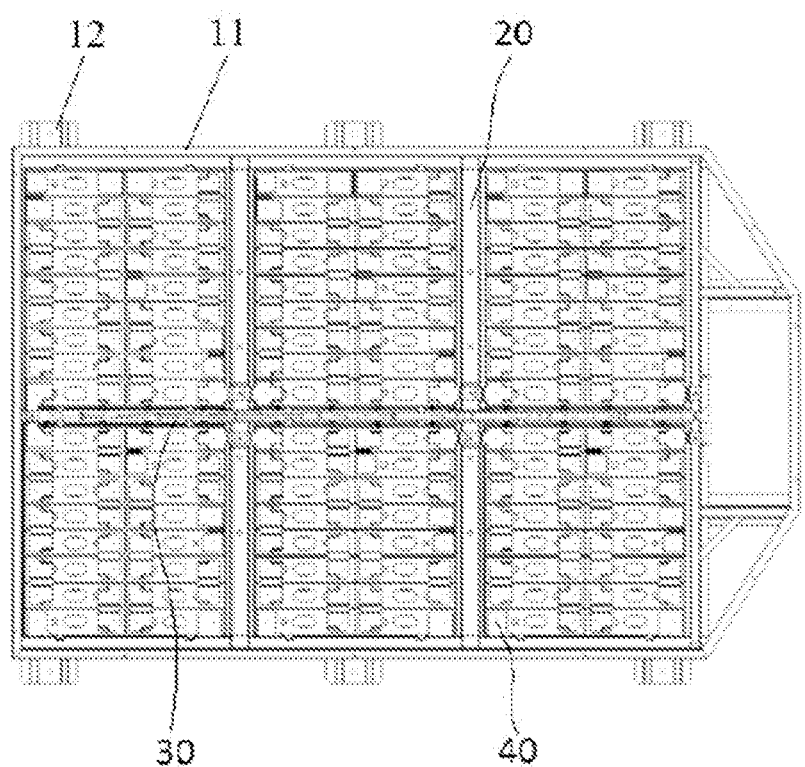
FIG. 5 is a schematic structural top view of FIG. 4.
Figure 6:
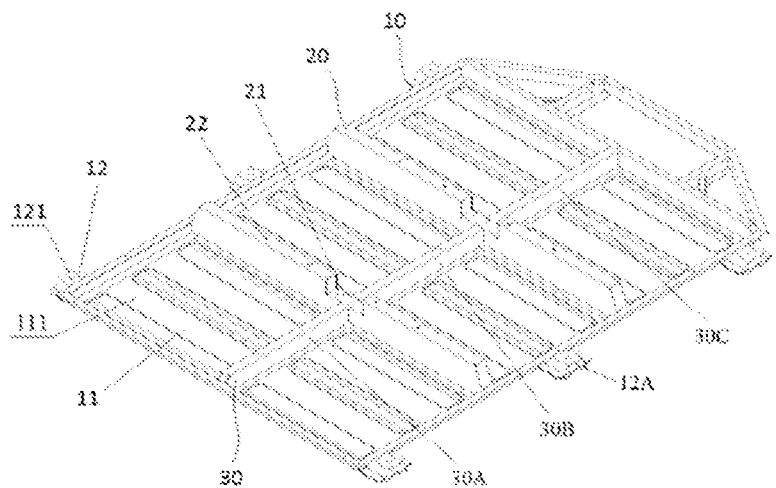
FIG. 6 is a schematic structural diagram of combination of a box body, a hitch beam, and a reinforcing beam of a battery pack according to an embodiment of this application.
Figure 7:
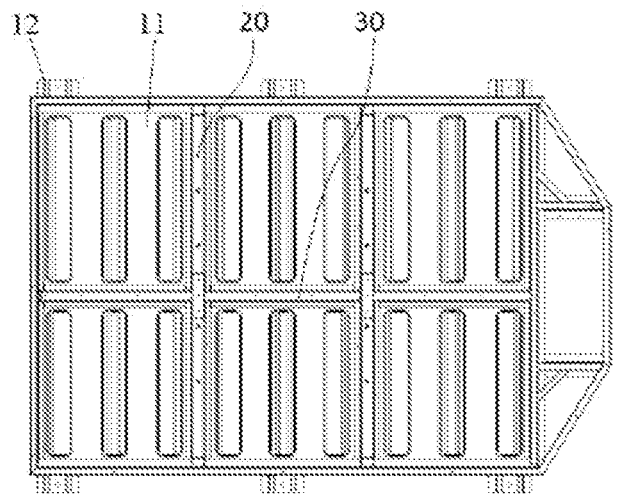
FIG. 7 is a schematic structural top view of FIG. 6.

In the embodiments shown in FIG. 1 to FIG. 11, the top of the hitch beam 20 means the top in the third direction Z, that is, a top face of the hitch beam 20. The top of the battery cells 40 means the top in the third direction Z, that is, a top face of the battery cells 40. As shown in FIG. 4, the top face of the hitch beam 20 is higher than the top face of the battery cells 40.

The top of the hitch beam 20 is higher than the top of the battery cells 40, so that the battery cells 40 as a whole can be accommodated in the space partitioned off by the hitch beam 20. When the battery pack or the vehicle containing the battery pack is impacted by an external force, the hitch beam 20 can fully surround and protect the battery cells 40, thereby helping to prevent all or part of the battery cells 40 from being directly impacted by the external force, and helping to improve safety performance of the battery pack.

In some embodiments, a first hitch point 22 configured to hitch the battery pack to a vehicle body is disposed at the top of the hitch beam 20. The hitch point disposed on the hitch beam 20 in the partition beams to hitch the battery pack to the vehicle body improves stability of connection between the battery pack and the vehicle body.

In the plurality of battery modules, each battery module includes a plurality of battery cells 40. Each battery module is disposed in a corresponding accommodation unit V.

As shown in FIG. 1 to FIG. 3, in some embodiments, no module group is designed for the battery modules, and the battery module may include a plurality of battery cells 40. The battery cells 40 are bonded to the bottom wall 111 of the box body 11.

In an embodiment not shown in the drawing, the battery module may be a battery module group that includes a plurality of battery cells, side plates, end plates, and other structures. The battery module is mounted onto the partition beam inside the battery pack through the end plates or side plates.

In some embodiments, the bottom of the hitch beam 20 abuts against and is fixedly connected to the bottom wall of the box body 11, and the top of the hitch beam 20 abuts against the cover body. Because the partition beam disposed partitions the accommodation space inside the battery pack into smaller accommodation units V, the top of the hitch beam 20 abuts against the cover body 13, and the bottom of the hitch beam abuts against and is fixedly connected to the bottom wall 111 of the box body 11, the hitch beam 20 provides reliable support for the box body 11 and the cover body 13 of the battery pack. This effectively improves the mode shape and rigidity of the battery pack, helps to maintain the shape of the accommodation space of the battery accommodation box 10, and thereby helps to protect the battery module and battery cells 40 from being damaged by an external force.

As shown in FIG. 1 to FIG. 11, in some embodiments, the first direction X is a width direction of the battery pack. To be specific, the hitch beam 20 is a cross beam extending in the width direction inside the battery pack. The hitch beam 20 is a cross beam, and can partition the accommodation space of the battery pack into smaller spaces in a length direction, so that the battery modules are distributed more reasonably. In addition, a hitch point for hitching to the vehicle body is disposed on the cross beam, thereby further improving the mode shape and rigidity of the battery pack.

As shown in FIG. 1 to FIG. 11, in some embodiments, the partition beam includes a plurality of hitch beams 20 spaced out along the second direction Y. The second direction Y is perpendicular to the first direction X and parallel to the bottom wall 111 of the box body 11. The second direction Y is also a travel direction of the vehicle. The plurality of hitch beams 20 disposed help to increase the strength of the battery pack itself, and also help to improve stability of the connection between the battery pack and the vehicle body.

In the embodiments shown in FIG. 1 to FIG. 11, two hitch beams 20 are spaced out in the second direction Y. The two hitch beams 20 evenly partition the accommodation space of the battery accommodation box 10 into three smaller accommodation portions in the second direction Y.

In some embodiments not shown in the drawings, the quantity of hitch beams may be set as required according to factors such as the size of the vehicle and the size of the battery pack. The layout of the hitch beams does not necessarily evenly partition the accommodation space into a plurality of accommodation parts.

In addition, in some embodiments not shown in the drawings, the first direction X may also be the length direction of the battery pack. In this case, the second direction Y is the width direction of the battery pack.

As shown in FIG. 1, FIG. 4 to FIG. 8, and FIG. 10 to FIG. 11, in some embodiments, at least two first hitch points 22 are disposed on each hitch beam 20. The at least two first hitch points 22 on one hitch beam 20 are spaced out in the first direction X. The at least two first hitch points 22 disposed on one hitch beam 20 helps to implement more stable connection between the battery pack and the vehicle body, helps to distribute the weight of the battery pack among the plurality of first hitch points 22, and helps to reduce strength requirements on the first hitch points 22.

In the embodiments shown in FIG. 1 to FIG. 11, four first hitch points 22 spaced out in the first direction X are disposed on each hitch beam 20 among the two hitch beams 20.

Figure 8:
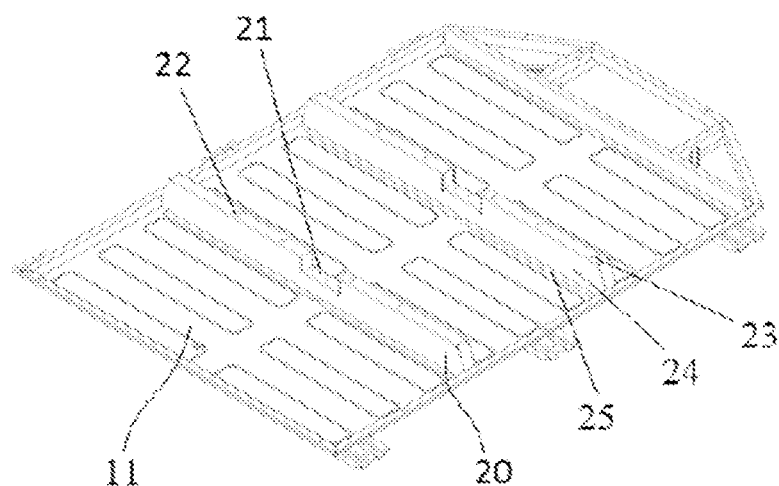
FIG. 8 is a schematic structural diagram of combination of a box body and a hitch beam of a battery pack according to an embodiment of this application.

As shown in FIG. 8, the hitch beam 20 includes a hitch beam top wall 23, hitch beam side walls 24, and a hitch beam mounting edge 25. The hitch beam top wall 23 is connected to the cover body 13. In some embodiments, the hitch beam top wall 23 abuts against the cover body 13. The hitch beam side walls 24 are located on two sides of the hitch beam top wall 23 in the second direction Y and connected to the hitch beam top wall, and extend from the hitch beam top wall 23 toward the bottom wall 111 of the box body 11. The hitch beam mounting edge 25 is connected to a bottom of one of the hitch beam side walls 24, and extends from the one of the hitch beam side walls 24 toward a side away from the one of the hitch beam side walls 24. The first hitch point 22 is disposed on the hitch beam top wall 23. The hitch beam 20 is connected to the bottom wall 111 of the box body 11 through the hitch beam mounting edge 25. The hitch beam mounting edge 25 may be connected to the bottom wall 111 of the box body 11 by a screw or by welding, for example.

As shown in FIG. 1 to FIG. 11, in some embodiments, the partition beam further includes a reinforcing beam 30 disposed along the second direction Y perpendicular to the first direction X and parallel to the bottom wall 111 of the box body 11. The reinforcing beam 30 is connected to the hitch beam 20. The reinforcing beam 30 may coordinate with the hitch beam 20 to partition the accommodation space of the battery pack into smaller accommodation units V. The reinforcing beam 30 disposed can reinforce the overall structure of the battery pack.

In the embodiments shown in FIG. 1 to FIG. 11, the second direction Y is a length direction of the battery pack, and the reinforcing beam 30 is a longitudinal beam disposed in the box body 11.

Figure 9:
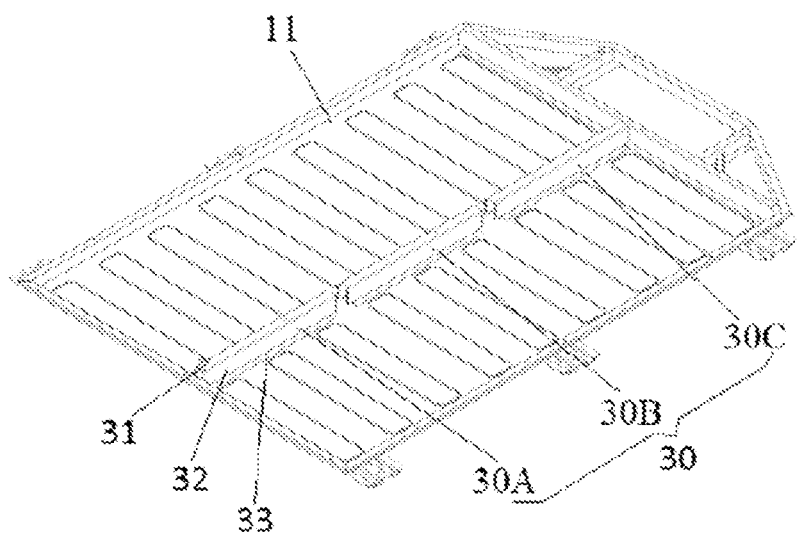
FIG. 9 is a schematic structural diagram of combination of a box body and a reinforcing beam of a battery pack according to an embodiment of this application.

As shown in FIG. 9, in some embodiments, the reinforcing beam 30 includes a reinforcing beam top wall 31, reinforcing beam side walls 32, and a reinforcing beam mounting edge 33. The reinforcing beam top wall 31 is spaced apart from the cover body 13. The reinforcing beam side walls 32 are located on two sides of the reinforcing beam top wall 31 in the first direction X and connected to the reinforcing beam top wall, and extend from the reinforcing beam top wall 31 toward the bottom wall 111 of the box body 11. The reinforcing beam mounting edge 33 is connected to a bottom of one of the reinforcing beam side walls 32, and extends from the one of the reinforcing beam side walls 32 toward a side away from the one of the reinforcing beam side walls 32. The reinforcing beam 30 is connected to the bottom wall 111 of the box body 11 through the reinforcing beam mounting edge 33. The reinforcing beam mounting edge 33 may be connected to the bottom wall 111 of the box body 11 by a screw or by welding, for example.

As shown in FIG. 8 and FIG. 9, at a position of joint between the hitch beam 20 and the reinforcing beam 30, a length of the reinforcing beam mounting edge 33 in the second direction Y is shorter than a reinforcing beam main body formed by the reinforcing beam top wall 31 and the reinforcing beam side walls 32, so as to avoid the hitch beam mounting edge 25 of the hitch beam 20. In this way, the hitch beam mounting edge 25 of the hitch beam 20 and the reinforcing beam mounting edge 33 of the reinforcing beam 30 are butted rather than superimposed in a height direction. Therefore, the disposition of the hitch beam mounting edge 25 and the reinforcing beam mounting edge 33 does not cause unevenness of the hitch beam main body formed by the hitch beam top wall 23 and the hitch beam side walls 24 or unevenness of the reinforcing beam main body, but is conducive to firm connection of the hitch beam 20 and the reinforcing beam 30 to the bottom wall 111 of the box body 11.

In the embodiments shown in FIG. 1 to FIG. 11, the hitch beam 20 is integrally disposed along the first direction X. That is, along the first direction X, the hitch beam 20 is integrated, uninterrupted, and not partitioned by other mechanical parts. The reinforcing beam 30 includes a plurality of reinforcing beam sections that are partitioned by the hitch beam 20 and disposed sequentially in the second direction Y.

As shown in FIG. 1 to FIG. 5, and FIG. 7 to FIG. 10, in this embodiment, one reinforcing beam 30 is disposed in the battery pack. The reinforcing beam 30 includes three reinforcing beam sections disposed sequentially in the second direction Y. The three reinforcing beam sections are a first reinforcing beam section 30A, a second reinforcing beam section 30B, and a third reinforcing beam section 30C.

Alternatively, in some embodiments not shown in the drawings, the reinforcing beam may be integrally disposed along the second direction Y. That is, along the second direction Y, the reinforcing beam is integrated, uninterrupted, and not partitioned by other mechanical parts. The hitch beam includes a plurality of hitch beam sections that are partitioned by the reinforcing beam and disposed sequentially in the first direction X.

Alternatively, in an embodiment not shown in the drawings, both the hitch beam and the reinforcing beam are disposed in sections. At each different position of joint, either the hitch beam is severed or the reinforcing beam is severed.

In the embodiments shown in FIG. 1 to FIG. 11, just one reinforcing beam is disposed. In an embodiment not shown in the drawings, at least two reinforcing beams may be disposed as required.

In some embodiments, the top of the hitch beam 20 is higher than the top of the reinforcing beam 30. To be specific, in the embodiments shown in FIG. 1 to FIG. 11, a top face of the hitch beam top wall 23 of the hitch beam 20 is higher than a top face of the reinforcing beam top wall 31 of the reinforcing beam 30. With the top of the hitch beam 20 being higher than the top of the reinforcing beam 30, different battery modules can be electrically connected conveniently, the weight of the battery pack is reduced and the material of the reinforcing beam is conserved on the basis of ensuring overall strength of the battery pack.

In some embodiments not shown in the drawings, the height of the hitch beam may be equal to that of the reinforcing beam.

In some embodiments not shown in the drawings, the partition beam may include both a hitch beam extending in the first direction and a hitch beam extending in the second direction concurrently. Except an extension direction, the hitch beam extending in the second direction is similar to the hitch beam extending in the first direction in terms of structures and coordination relationships with the parts such as the box body, the cover body, and the reinforcing beam.

In some embodiments not shown in the drawings, the partition beam may include both a reinforcing beam extending in the first direction and a reinforcing beam extending in the second direction concurrently. Except an extension direction, the reinforcing beam extending in the first direction is similar to the reinforcing beam extending in the second direction in terms of structures and coordination relationships with the parts such as the box body, the cover body, and the hitch beam.

Figure 10:
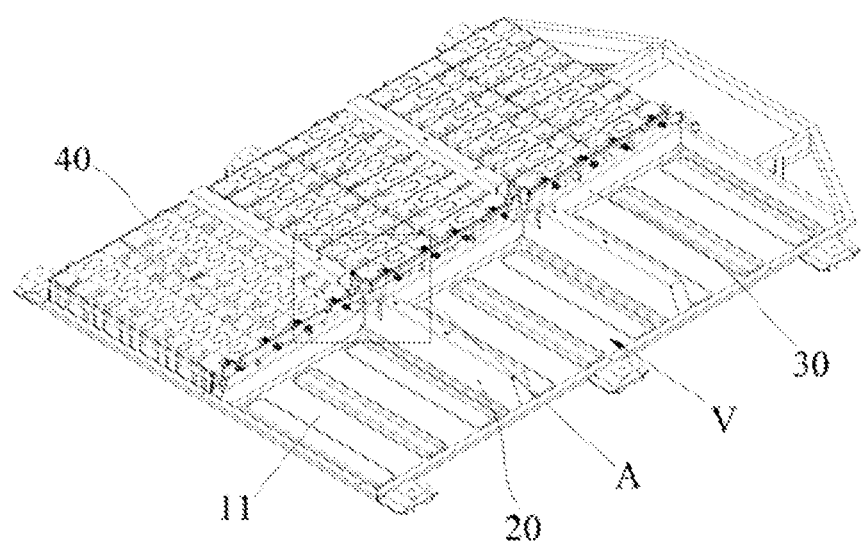
FIG. 10 is a schematic structural diagram of the structure shown in FIG. 4 after battery cells are removed from some accommodation units.
Figure 11:
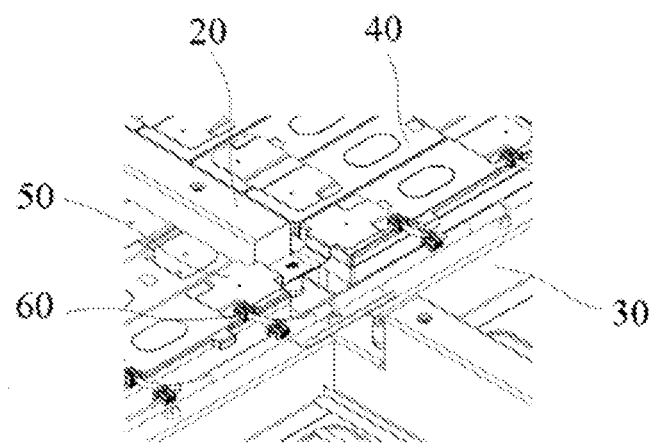
FIG. 11 is a local detailed view of a position A shown in FIG. 10.

As shown in FIG. 10 to FIG. 11, in some embodiments, the battery pack further includes a connecting member 50 connected to output ends of different battery modules and a signal collecting member 60 electrically connected to the battery cells 40. The connecting member 50 and the signal collecting member 60 are disposed at the top of the reinforcing beam 30. With the design of disposing the connecting member 50 and the signal collecting member 60 on the reinforcing beam 30, the design of the connecting member 50 and the signal collecting member 60 can be made regular, safe, and more reliable on the basis of reinforcing the overall frame of the battery pack.

As shown in FIG. 11, in this embodiment, the connecting member 50 includes an electrical connecting plate. The electrical connecting plate is configured to implement serial connection or parallel connection between battery modules, and may be an aluminum connecting plate or a copper connecting plate, for example.

The signal collecting member 60 is configured to collect a temperature or voltage signal of a battery cell, and includes, for example, a conducting wire, a flexible printed circuit board (FPC), or a printed circuit board (PCB).

As shown in FIG. 1 to FIG. 11, in some embodiments, an avoidance notch 21 configured to avoid the connecting member 50 and the signal collecting member 60 is disposed at a position of joint between the hitch beam 20 and the reinforcing beam 30.

In the embodiments shown in FIG. 1 to FIG. 11, a bottom wall of the avoidance notch 21 is flush with the top face of the reinforcing beam 30. Nevertheless, as long as the connecting member 50 and the signal collecting member 60 can smoothly pass through the position of joint between the hitch beam 20 and the reinforcing beam 30, the bottom wall of the avoidance notch 21 may be higher or lower than the top face of the reinforcing beam 30.

To connect the first hitch component and the first hitch point 22 smoothly, a via hole 131 corresponding to the first hitch point 22 is disposed on the cover body 13. The first hitch point 22 may include, for example, a connecting hole disposed at the top of the hitch beam 20, such as a through-hole or a threaded hole disposed on the top wall 23 of the hitch beam 20.

As shown in FIG. 1 to FIG. 11, in some embodiments, the battery accommodation box 10 further includes a cantilever beam 12. The cantilever beam 12 is fixedly connected to an outer side of a bottom of the box body 11. Bulges 12A protruding outward from side walls of the box body 11 are disposed at two ends of the cantilever beam 12. Second hitch points 121 configured to hitch the battery pack to the vehicle body are disposed on the bulges 12A.

The vehicle according to this embodiment further includes a second hitch component corresponding to each second hitch point. The second hitch component connects the second hitch point 121 of the cantilever beam 12 to the vehicle body. In this way, through the first hitch point 22 and the second hitch point 121 in coordination with the first hitch component and the second hitch component respectively, the battery pack is hitched onto the vehicle body of the vehicle. Through the joint action of the cantilever beam 12 and the hitch beam 20, the battery pack can be firmly connected to the vehicle body, thereby helping to meet the strength requirements on the battery pack under various travel conditions. The second hitch point 121 may be a threaded hole or a through-hole, for example.

In some embodiments, the cantilever beam 12 extends in the first direction X and is arranged alternately with the hitch beam 20 in the second direction Y. Such disposition achieves more even distribution of all hitch points of the battery pack and the vehicle body, and more even reception of force on the battery pack.

In the embodiments shown in FIG. 1 to FIG. 11, the hitch beam 20 and the cantilever beam 12 that is located at the bottom of the battery pack jointly carry the weight of the battery pack.

In some embodiments, both the first hitch component and the second hitch component may include a bolt or a screw.

As shown in FIG. 3, an underbody 90 includes a mounting hole 91 and a mounting portion (not shown). The mounting hole 91 is disposed on a board face of the underbody 90, and corresponds to the via hole 131 of the cover body 13 of the battery pack, and is configured to fit with the first hitch component. The mounting portion is disposed on a lateral part of the underbody 90, and is configured to coordinate with the second hitch component.

As shown in FIG. 2, the first hitch component includes a hitch sleeve 81, a bolt 82, a nut 83, and a sealing gasket 84. The nut 83 may be welded to an upper surface of the underbody 90.

A through-hole 111a opposite to a connecting hole and the via hole 131 on the cover body 13 is disposed on the bottom wall 111 of the box body 11 of the battery accommodation box 10, where the connecting hole serves as the first hitch point 22 on the hitch beam 20.

The hitch sleeve 81 includes a cylinder and a flange located at one end of the cylinder (in FIG. 3, the bottom of the hitch sleeve 81). A sealing slot is disposed on an end face of the other end of the cylinder (in FIG. 3, the top of the hitch sleeve 81). The other end of the cylinder of the hitch sleeve 81 penetrates into the battery pack from the through-hole 111a on the bottom wall 111, and passes through the connecting hole serving as the first hitch point 22 on the hitch beam 20. An end face of the other end of the cylinder abuts against a lower surface of the cover body 13. The flange of the cylinder abuts against a lower surface of the bottom wall 111.

One end of the bolt 82 (in FIG. 3, the bottom of the bolt 82) contains a flange, and the other end of the bolt 82 extends from a flanged end of the hitch sleeve 81 into a central through-hole of the hitch sleeve 81, and sequentially passes through the connecting hole serving as the first hitch point 22 on the hitch beam 20, the via hole 131 on the cover body 13, and the mounting hole 91 on the underbody 90, and then screws into the nut 83. After tight screwing, the flange of the bolt 82 abuts against the end face of the flanged end of the hitch sleeve 81. In this way, the battery pack can be connected to the vehicle body through the first hitch component and the hitch beam 20.

The sealing gasket 84 is mounted in the sealing slot. The sealing gasket 84 can prevent liquid or dust from entering the battery pack through the via hole 131 on the cover body 13.

In some embodiments, the second hitch component may include a bolt and a nut. The second hitch point 121 of the cantilever beam 12 is connected to the mounting portion on the underbody 90 of the vehicle body through the bolt and the nut. In this way, the battery pack can be connected to the vehicle body through the second hitch component and the cantilever beam 12.

As can be learned from the above description, the foregoing embodiments of this application have at least one of the following advantages:

The partition beam is disposed to partition the accommodation space inside the battery pack into smaller accommodation units. The top of the hitch beam is higher than the top of the battery cells, so that the battery cells as a whole can be accommodated in the space partitioned off by the hitch beam. When the battery pack or the vehicle containing the battery pack is impacted by an external force, the hitch beam can fully surround and protect the battery cells, thereby helping to prevent all or part of the battery cells from being directly impacted by the external force, and helping to improve safety performance of the battery pack.

The first hitch point disposed on the hitch beam in the partition beams to hitch the battery pack to the vehicle body improves stability of connection between the battery pack and the vehicle body.

The top of the hitch beam abuts against the cover body, and the bottom of the hitch beam abuts against and is fixedly connected to the box body, thereby effectively improving the mode shape and rigidity of the battery pack, helping to maintain the shape of the accommodation space, and helping to firmly connect the battery pack to the vehicle body.

The hitch beam is a cross beam extending in a width direction inside the battery pack, and can partition the accommodation space of the battery pack into smaller accommodation portions in a length direction, so that the battery modules are distributed more reasonably. A hitch point for hitching to the vehicle body is disposed on the cross beam, thereby further improving the mode shape and rigidity of the battery pack.

On the basis of the cross beam disposed inside the battery pack, a longitudinal beam is added to partition the battery pack into smaller units, thereby reinforcing the overall frame strength of the battery pack.

The signal collecting member and the connecting member are disposed on the longitudinal beam, thereby improving reliability of the disposition of the signal collecting member and the connecting member.

The cross beam is integrated, and the longitudinal beam is spliced for an avoidance purpose; or, the longitudinal beam is integrated, and the cross beam is spliced for an avoidance purpose, which, in each case, increases the overall rigidity of the battery pack and enhances the mode shape of the battery pack.

At the position of joint between the cross beam and the longitudinal beam, the cross beam is locally shortened in height to make a notch, thereby facilitating connection of the connecting members or signal collecting members between the battery modules.

Although this application has been described with reference to exemplary embodiments, various improvements may be made to the embodiments without departing from the scope of this application, and the parts therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A battery pack, comprising:
   a battery accommodation box, comprising a box body and a cover body, wherein the box body fits with the cover body to form an accommodation space;
   a partition beam, disposed in the accommodation space to partition the accommodation space into a plurality of accommodation units, wherein the partition beam comprises a hitch beam that extends in a first direction parallel to a bottom wall of the box body, a bottom of the hitch beam is fixed to the bottom wall of the box body in a third direction perpendicular to the bottom wall of the box body, and a top of the hitch beam is connected to the cover body; and
   a plurality of battery modules, wherein the battery modules comprise a plurality of battery cells, and each battery module is disposed in a corresponding accommodation unit;
   wherein, in the third direction, the top of the hitch beam is higher than a top of the battery cells;
   wherein a first hitch point configured to connect the battery pack to a vehicle body is disposed at the top of the hitch beam; and
   wherein the hitch beam comprises:
   a hitch beam top wall, connected to the cover body, wherein the first hitch point is disposed on the hitch beam top wall;
   hitch beam side walls, located on two sides of the hitch beam top wall in a second direction and connected to the hitch beam top wall, wherein the second direction is perpendicular to the first direction and parallel to the bottom wall of the box body, and the hitch beam side walls extend from the hitch beam top wall toward the bottom wall of the box body; and
   a hitch beam mounting edge, connected to a bottom of one of the hitch beam side walls, wherein the hitch beam mounting edge extends from the one of the hitch beam side walls toward a side away from the one of the hitch beam side walls, and the hitch beam is connected to the bottom wall of the box body through the hitch beam mounting edge.

2. The battery pack according to claim 1, wherein the partition beam further comprises a reinforcing beam extending in a second direction, the reinforcing beam is connected to the hitch beam, and the second direction is perpendicular to the first direction and parallel to the bottom wall of the box body.

3. The battery pack according to claim 2, wherein a bottom of the reinforcing beam is fixed to the bottom wall of the box body, and a top of the reinforcing beam is spaced apart from the cover body.

4. The battery pack according to claim 3, wherein the reinforcing beam comprises:
   a reinforcing beam top wall, spaced apart from the cover body;
   reinforcing beam side walls, located on two sides of the reinforcing beam top wall in the first direction and connected to the reinforcing beam top wall, wherein the reinforcing beam side walls extend from the reinforcing beam top wall toward the bottom wall of the box body; and
   a reinforcing beam mounting edge, connected to a bottom of one of the reinforcing beam side walls, wherein the reinforcing beam mounting edge extends from the one of the reinforcing beam side walls toward a side away from the one of the reinforcing beam side walls, and the reinforcing beam is connected to the bottom wall of the box body through the reinforcing beam mounting edge.

5. The battery pack according to claim 2, wherein
   the hitch beam is integrally disposed in the first direction, and the reinforcing beam comprises a plurality of reinforcing beam sections that are partitioned by the hitch beam and disposed sequentially in the second direction; or
   the reinforcing beam is integrally disposed in the second direction, and the hitch beam comprises a plurality of hitch beam sections that are partitioned by the reinforcing beam and disposed sequentially in the first direction.

6. The battery pack according to claim 2, wherein, in the third direction, the top of the hitch beam is higher than the top of the reinforcing beam.

7. The battery pack according to claim 6, wherein the battery pack further comprises a connecting member electrically connected to output ends of different battery modules and a signal collecting member electrically connected to the battery cells, and the connecting member and the signal collecting member are disposed at the top of the reinforcing beam.

8. The battery pack according to claim 7, wherein an avoidance notch configured to avoid the connecting member and the signal collecting member is disposed at a position of joint between the hitch beam and the reinforcing beam.

9. The battery pack according to claim 1, wherein the cover body comprises a via hole corresponding to the first hitch point.

10. The battery pack according to claim 1, wherein the first hitch point comprises a connecting hole disposed at the top of the hitch beam.

11. The battery pack according to claim 1, wherein the battery accommodation box further comprises a cantilever beam, the cantilever beam is fixedly connected to an outer side of a bottom of the box body, bulges protruding outward from side walls of the box body are disposed at two ends of the cantilever beam, and second hitch points configured to connect the battery pack to a vehicle body are disposed on the bulges.

12. The battery pack according to claim 11, wherein the cantilever beam extends in the first direction and is arranged alternately with the hitch beam in a second direction, and the second direction is perpendicular to the first direction and parallel to the bottom wall of the box body.

13. A vehicle, comprising a vehicle body, a battery pack, and a first hitch component, wherein a first hitch point is disposed at a top of the hitch beam, the first hitch component is configured to connect the battery pack to the vehicle body through the first hitch point, and the battery pack comprises:

a battery accommodation box, comprising a box body and a cover body, wherein the box body fits with the cover body to form an accommodation space;

a partition beam, disposed in the accommodation space to partition the accommodation space into a plurality of accommodation units, wherein the partition beam comprises a hitch beam that extends in a first direction parallel to a bottom wall of the box body, a bottom of the hitch beam is fixed to the bottom wall of the box body in a third direction perpendicular to the bottom wall of the box body, and a top of the hitch beam is connected to the cover body; and a plurality of battery modules, wherein the battery modules comprise a plurality of battery cells, and each battery module is disposed in a corresponding accommodation unit;

wherein, in the third direction, the top of the hitch beam is higher than a top of the battery cells;

wherein a first hitch point configured to connect the battery pack to a vehicle body is disposed at the top of the hitch beam; and wherein the hitch beam comprises:

a hitch beam top wall, connected to the cover body, wherein the first hitch point is disposed on the hitch beam top wall;

hitch beam side walls, located on two sides of the hitch beam top wall in a second direction and connected to the hitch beam top wall, wherein the second direction is perpendicular to the first direction and parallel to the bottom wall of the box body, and the hitch beam side walls extend from the hitch beam top wall toward the bottom wall of the box body; and a hitch beam mounting edge, connected to a bottom of one of the hitch beam side walls, wherein the hitch beam mounting edge extends from the one of the hitch beam side walls toward a side away from the one of the hitch beam side walls, and the hitch beam is connected to the bottom wall of the box body through the hitch beam mounting edge.

* * * * *